US009415370B2

(12) United States Patent
Schulte et al.

(10) Patent No.: US 9,415,370 B2
(45) Date of Patent: Aug. 16, 2016

(54) METHOD FOR THE PRODUCTION OF POLYMERS

(75) Inventors: Niels Schulte, Kelkheim (DE); Esther Breuning, Niedernhausen (DE); Hubert Spreitzer, Viernheim (DE)

(73) Assignee: Merck Patent GmbH (DE)

( * ) Notice: Subject to any disclaimer, the term of this patent is extended or adjusted under 35 U.S.C. 154(b) by 11 days.

(21) Appl. No.: 11/722,920

(22) PCT Filed: Dec. 24, 2005

(86) PCT No.: PCT/EP2005/014038
§ 371 (c)(1),
(2), (4) Date: Jun. 27, 2007

(87) PCT Pub. No.: WO2006/069773
PCT Pub. Date: Jul. 6, 2006

(65) Prior Publication Data
US 2008/0207851 A1 Aug. 28, 2008

(30) Foreign Application Priority Data

Dec. 28, 2004 (EP) .................................... 04030883

(51) Int. Cl.
*C08G 75/00* (2006.01)
*B01J 19/00* (2006.01)
*C08G 61/00* (2006.01)

(52) U.S. Cl.
CPC .............. *B01J 19/0093* (2013.01); *C08G 61/00* (2013.01); *B01J 2219/00862* (2013.01); *B01J 2219/00867* (2013.01); *B01J 2219/00869* (2013.01); *B01J 2219/00984* (2013.01)

(58) Field of Classification Search
CPC ..................................................... C08G 61/00
USPC ........................................................ 528/394
See application file for complete search history.

(56) References Cited

U.S. PATENT DOCUMENTS

| 5,738,791 | A  | * | 4/1998  | Schomaker et al. .......... 210/638 |
| 6,329,139 | B1 |   | 12/2001 | Nova et al.                        |
| 6,340,732 | B1 | * | 1/2002  | Feast et al. .................... 526/291 |
| 6,737,026 | B1 | * | 5/2004  | Bergh et al. .................... 422/130 |
| 2003/0083341 | A1 | * | 5/2003 | Butera et al. .................. 514/277 |
| 2003/0135014 | A1 | * | 7/2003 | Radu et al. ..................... 528/230 |
| 2004/0192542 | A1 | * | 9/2004 | Choudary et al. ............. 502/159 |
| 2006/0058494 | A1 | * | 3/2006 | Busing et al. .................. 528/86 |

FOREIGN PATENT DOCUMENTS

| DE | 246257 A1      | 6/1987  |
| DE | 246257 A1      | 6/1987  |
| WO | 94/09063 A1    | 4/1994  |
| WO | WO-94/09063 A1 | 4/1994  |
| WO | 98/15825 A2    | 4/1998  |
| WO | WO-98/15825 A2 | 4/1998  |
| WO | WO-99/20675 A1 | 4/1999  |
| WO | WO-02/081079 A2| 10/2002 |
| WO | 03/089130 A1   | 10/2003 |
| WO | WO-03/089130 A1| 10/2003 |
| WO | WO-2007/059946 A2 | 5/2007 |

OTHER PUBLICATIONS

Suzuki et al. (Chem. Rev., 1995, 95, 2457-2483).*
Jähnisch et al., "Chemistry in Microstructured Reactors", *Angew. Chem. Ind. Ed.*, vol. 43, pp. 406-446 (2004).
Wu et al., "A New Synthetic Method for Controlled Polymerization Using a Microfluidic System", *J. Am. Chem. Soc.*, vol. 126, pp. 9880-9881 (2004).
Nagaki et al., "Cation Pool-Initiated Controlled/Living Polymerization Using Microsystems", *J. Am. Chem. Soc.*, vol. 126, pp. 14702-14703 (2004).
Iwasaki et al., "Free Radical Polymerization in Microreactors. Significant Improvement in Molecular Weight Distribution Control", *Macromolecules*, vol. 38, pp. 1159-1163 (2005).
Shinar, "Organic Light-Emitting Devices—A Survey", pp. 266-269 (2004).

* cited by examiner

*Primary Examiner* — Shane Fang

(57) ABSTRACT

The present invention relates to a process for preparing polymers by polycondensation catalyzed by transition metals. These polymers are of great importance in, in particular, the fast-growing field of organic semiconductors. The polymers obtained by the process of the invention can be prepared with greater reproducibility and in higher purity than polymers obtained according to the prior art.

26 Claims, No Drawings

METHOD FOR THE PRODUCTION OF POLYMERS

RELATED APPLICATIONS

This application is a national stage application (under 35 U.S.C. §371) of PCT/EP2005/014038 filed Dec. 24, 2005, which claims benefit of European application 04030883.5 filed Dec. 28, 2004.

Conjugated or partially conjugated polymers play an increasingly important role in the field of organic semiconductors (e.g. for applications in polymeric light-emitting diodes, organic transistors, organic ICs, organic solar cells, organic laser diodes, etc.). Typical classes of these polymers encompass polyarylene-vinylenes (e.g. as described in EP 0443861, WO 94/20589, WO 98/27136, EP 1025183, WO 99/24526 and EP 0964045), polyarylene-acetylehes or polyarylenes in the broadest sense. Typical representatives of polyarylenes are, inter alia, polyfluorenes (e.g. as described in EP 842208 or WO 00/22026), polyspirobifluorenes (e.g. as described in EP 707020 or EP 894107), poly-para-phenylenes (e.g. as described in WO 92/18552), polycarbazoles (e.g. as described in WO 04/070772 or WO 04/113468), polydihydrophenanthrenes (e.g. as described in WO 05/014689), polyindenofluorenes (e.g. as described in WO 04/041901 or WO 04/113412), poly-phenanthrenes (e.g. as described in DE 102004020298.2) or polythiophenes (e.g. as described in EP 1028136) or copolymers which comprise various units of these types. It is also possible for further repeating units which assume tasks such as charge transport or emission to be present. The polymers can be conjugated, partially conjugated or nonconjugated.

Various coupling reactions catalysed by transition metals have been found to be useful for preparing conjugated, partially conjugated or nonconjugated polyarylenes, in particular the Suzuki coupling (e.g. as described in WO 03/048225, WO 99/20675 or WO 00/53656) and the Yamamoto coupling (e.g. as described in WO 04/022626) and also further coupling reactions, for example the Hartwig-Buchwald coupling (e.g. J. F. Hartwig, *Angew. Chem. Int. Ed.* 1998, 37, 2047-2067) when the polymers have arylamine groups.

Some of these processes are already relatively well developed, so that polymers having a high degree of polymerization can be obtained using them. However, all these processes suffer from various problems, so that they cannot yet be regarded as technologically and ecologically satisfactory:

1) All these processes employ large amounts of organic solvents which are ecologically problematical and when used on a large scale are accompanied by safety risks. It would be desirable here to be able to reduce the amounts of solvent significantly in order to increase safety for human beings and the environment.
2) The polycondensation according to the prior art does not yet lead to fully reproducible results, which in turn has an influence on the electronic properties in the production of the abovementioned electronic devices. Thus, the properties of the polymers are, for example, dependent on the molecular weight, on defects in the polymer and on the end groups. However, these are still not able to be controlled sufficiently accurately in the processes according to the prior art. Better control is desirable here in order to ensure better reproducibility.
3) To allow application of the polymers by means of printing techniques, for example inkjet printing, the molecular weight of the polymer has to be set very precisely. Such precise control of the molecular weight in the reaction has hitherto not been possible using the methods of the prior art, so that the polymers frequently have to be subjected to complicated after-treatments after the reaction (e.g. as described in WO 03/019694), but this is usually associated with a deterioration in the electronic properties.
4) The polydispersity of the polymers obtained according to the prior art has hitherto usually still been significantly higher than the theoretically achievable polydispersity of 2. However, experiments carried out by us have shown polymers having a higher polydispersity generally have poorer properties in the electronic device, so that an improvement is desirable here.
5) The purity of the polymers obtained according to the prior art, in particular the content of inorganic impurities, has hitherto not yet been satisfactory. However, it is known that relatively pure polymers display better results when used in organic electronic devices.

It can be seen from this that there is still a significant need for improvement in polycondensation processes proceeding by coupling reactions catalysed by transition metals.

We have now surprisingly found that the abovementioned problems can be significantly reduced or are eliminated entirely when the appropriate polycondensation is carried out in a continuous tube reactor which can be either a microreactor or a tube reactor having a somewhat larger diameter. The structure of microreactors is described, for example, in DD 246257. An overview of reactions in microreactors is given, for example, by K. Jähnisch et al. (*Angew. Chem.* 2004, 116, 410-451). It is conspicuous here that although reactions catalysed by transition metals, for example Suzuki couplings or Heck couplings, in a continuous tube reactor have been described, no corresponding polycondensations catalysed by transition metals have been described. This is surprising since the poly-Suzuki reaction in particular, but also the poly-Yamamoto reaction or the poly-Hartwig-Buchwald reaction, is of great importance for the synthesis of conjugated polymers and can also be employed for the synthesis of partially conjugated or nonconjugated polymers. This suggests that such reactions cannot be carried out in a continuous tube reactor, in particular in tube reactors having a narrow diameter and microreactors, possibly because of the formation of highly viscous polymer solutions and stiff, rod-shaped polymers. It is now particularly surprising and unexpected that this reaction proceeds significantly better and more quickly despite the narrow channels of the reactor than does a standard reaction according to the prior art in glass flasks or, on an industrial scale, in a tank reactor and leads to polymers having significantly improved properties. Furthermore, the reaction in a continuous tube reactor can be carried out with greater reproducibility and the molecular weight can be set more precisely and the polymers can be obtained in greater purity. A further industrial advantage is that the reaction can be carried out continuously.

The invention accordingly provides a process for preparing polymers or oligomers by means of C—C or C—N coupling reactions in the presence of transition metal catalysts in a solvent or solvent mixture, optionally with addition of at least one base and/or at least one additive, characterized in that the reaction is carried out in a continuous tube reactor.

For the purposes of the present invention, a continuous tube reactor is a tubular reactor which can be operated continuously. It is particularly preferably a tube reactor having a narrow diameter or a microreactor. The volume of the tube reactor is preferably ≤20 ml, particularly preferably ≤10 ml, very particularly preferably ≤1 ml.

For the purposes of the present invention, a microreactor is a microsystem apparatus having a volume of ≤1000 μl, preferably ≤500 μl. It comprises at least two inlets and at least one outlet, at least one mixing element in which the starting solutions are intensively mixed at least once, at least one reaction section (=residence section), preferably a capillary, particularly preferably a heatable/coolable capillary, potentially at least one analysis element and potentially at least one demixing element. The inlets are accessible via pumps and tubing. The solutions are, after having been mixed in a mixing element, conveyed into the residence section to increase their residence time. For the purposes of the present invention, the residence time is the time between the mixing of the monomers and any further components and the work-up of the resulting reaction solution in order to purify and isolate the polymer.

Various materials are possible for the construction of the continuous tube reactor. Glass, stainless steel, ceramic, enamel, PTFE and PFA are particularly suitable for this purpose.

The channels of the continuous tube reactor preferably have a diameter of from 10 μm to 20 mm, particularly preferably from 100 μm to 10 mm, very particularly preferably from 200 μm to 5 mm, in particular from 500 μm to 2 mm. The channels can be either round or angular or have other shapes, with the sizes being of similar dimensions regardless of the shape.

The solutions are preferably pumped into the continuous tube reactor so that they flow through it at a flow rate of from 0.01 μl/min to 100 ml/min. The flow rate and therefore also the pressure are preferably set so that the residence time of the solution in the reactor is sufficient to ensure complete reaction of the monomers and to produce the desired molecular weight of the polymers.

According to the invention, the continuous tube reactor is preferably heatable/coolable. Furthermore, it potentially has a facility for ultrasonic treatment, for microwave irradiation and/or photochemical irradiation.

The necessary residence time in the process of the invention depends on various parameters such as temperature, the reactivity of the starting materials or the viscosity of the solution. A person skilled in the art will be able to match this residence time to the individual parameters and thus achieve optimal reaction conditions. Thus, the residence time of the reaction solution in the system employed can be set via the choice of the flow rate of the solutions and their concentration (and thus viscosity).

The reaction mixture can also be conveyed through two or more continuous tube reactors connected in series. This enables the residence time to be increased even at a relatively high flow rate and the monomers used to be reacted so that an optimal product yield and the desired molecular weight of the polymers is achieved. Further continuous tube reactors connected in series allow the reaction mixture to be worked up directly, if appropriate in one or more subsequent steps, for example by extraction and/or scrubbing of the reaction solution.

In another preferred embodiment of the invention, the number and arrangement of the tubes or channels in one or more continuous tube reactor(s) are varied so that the residence time is increased so that here too an optimal conversion and the desired molecular weight of the polymer are achieved at a relatively high flow rate.

In a further preferred embodiment of the invention, the reaction mixture is passed through two or more continuous tube reactors connected in parallel in order to increase the throughput.

The residence time of the reaction solution in the continuous tube reactor is preferably ≤2 hours, particularly preferably ≤1 hour, very particularly preferably ≤20 minutes, in particular ≤10 minutes. Here, it is conspicuous that the reaction time in the polycondensation in the continuous tube reactor is significantly lower than in the polycondensation according to the prior art on a laboratory scale. Thus, complete conversion and thus a high molecular weight can be achieved even at a residence time of less than 30 minutes or even in a few minutes.

The process of the invention can be carried out within a wide temperature range which is limited essentially by the heat resistance of the materials used for construction of the continuous tube reactor system and by the physical properties of the solutions used. The process of the invention is preferably carried out at a temperature of from −80 to +250° C., particularly preferably from 0 to 200° C., very particularly preferably from 40 to 130° C. Relatively high temperatures are preferable since highly viscous polymer solutions are formed in the reaction. At elevated temperature, their viscosity drops and transport of the solution through the tubes and channels of the reactor and the capillaries can occur more readily. In addition, slight thermal activation of the reaction is usually required, since the process is generally only weakly exothermic.

The process of the invention for the polycondensation of organic compounds by means of coupling reactions catalysed by transition metals is usually carried out under a protective gas atmosphere, preferably nitrogen and/or argon. However, it can also be carried out without use of a protective gas atmosphere.

To carry out the process of the invention, it is necessary to carry out the reaction in, if possible, a homogeneous or multiphase liquid phase in which no solid particles or only very small solid particles are present, since the channels of the continuous tube reactors could otherwise become blocked, in particular when microreactors or tube reactors having a very narrow diameter and very fine channels are used.

The course of the reaction can be monitored and controlled by means of various analytical methods. Thus, the continuous tube reactor can be equipped with various sensors. The course of the reaction is preferably monitored and controlled by means of viscometry. The control of the reaction is preferably effected via regulation of the temperature and/or, if appropriate, by means of further addition of catalyst solution. The measured viscosity of the solution is a measure of the degree of polymerization and thus the molecular weight of the polymer. Control of the reaction is significantly better when it is carried out in a continuous tube reactor than in known processes according to the prior art. The reproducibility is increased considerably as a result. Further possible analytical methods are GPC, sedimentation, vapour pressure osmosis, light scattering, small angle X-ray scattering and end group NMR. Furthermore, the continuous tube reactor can have windows, for example for UV/vis spectroscopy, IR spectroscopy, light scattering and/or microscopy.

After the reaction, the reaction mixture is worked up and the polymer is isolated. This can occur by means of conventional methods by collecting the reaction solution from the tube reactor and working it up batchwise. However, the reaction solution can also be extracted and worked up directly in the continuous tube reactor or in a further connected continuous tube reactor and after the work-up and extraction only has to be isolated, evaporated, spray dried or preferably precipitated batchwise. Preference is given to the extraction and work-up likewise being effected in a continuous tube reactor.

In the reaction, the polymer is formed by a polycondensation reaction, i.e. by a reaction in which, in each reaction step, a small molecule is eliminated with formation of a new bond between the monomers. Depending on the structure of the monomers, conjugated, partially conjugated or nonconjugated polymers can be formed. For the purposes of the present invention, conjugated polymers are polymers which contain mainly $sp^2$-hybridized carbon atoms, which may also be replaced by appropriate hetero atoms, in the main chain, in the simplest case, this means alternating presence of double (or possibly also triple) and single bonds in the main chain. "Mainly" means that naturally occurring defects which lead to interruptions to conjugation do not invalidate the term "conjugated polymer". On the other hand, units such as simple alkyl bridges, (thio)ether, ester, amide or imide linkages are clearly defined as nonconjugated segments. A partially conjugated polymer is a polymer in which relatively long conjugated sections in the main chain are interrupted by nonconjugated sections or in which relatively long conjugated sections are present in the side chains of a polymer whose main chain is nonconjugated. The process of the invention is preferably employed for preparing conjugated and partially conjugated polymers.

The polymers generally have from 10 to 10 000, preferably from 50 to 5000, particularly preferably from 50 to 2000, repeating units. A characteristic of the polymers is that they have a molecular weight distribution, i.e. a polydispersity. The polydispersity is preferably less than 10, particularly preferably less than 5, very particularly preferably less than 3.

For the purposes of the present invention, a C—C or C—N coupling reaction catalysed by transition metals is a coupling of two organic compounds to form a new C—C or C—N bond in the presence of a transition metal or a transition metal compound as catalyst, optionally with addition of at least one base and/or at least one further additive, with a reactive group being eliminated from each of the two organic compounds. The transition metal or transition metal compound is preferably selected from among palladium or palladium compounds, nickel or nickel compounds, cobalt or cobalt compounds or iron or iron compounds. Particular preference is given to palladium or palladium compounds or nickel or nickel compounds. For formation of polymers, it is necessary for each monomer to bear at least two reactive groups which can be reacted with one another or with the reactive groups of another monomer in the coupling reaction. For the purposes of the present invention, a reactive group is any group whose bond to a carbon atom or a nitrogen atom of the monomer is broken during the course of the coupling reaction and which then leaves the monomer. This can also be a single atom, e.g. a halogen or a hydrogen atom.

As monomers which have at least two reactive groups, all organic compounds which have at least two reactive groups and are known to those skilled in the art as monomers in such coupling reactions can be used in the process of the invention. Here, the groups described in more detail below under X and Y are possible as reactive groups.

The polycondensation reaction preferably proceeds according to the reaction shown in Scheme 1 or Scheme 2:

(Scheme 1)

(Scheme 2)

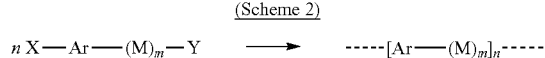

where the symbols and indices used have the following meanings:
X is identical or different on each occurrence and is in each case chlorine, bromine, iodine, fluoroalkylsulphonate or perfluoroalkylsulphonate, e.g. trifluoromethanesulphonate or nonafluorobutanesulphonate;
Y is identical or different on each occurrence and is in each case X or $B(OH)_2$, $B(OR)_2$, $BR_2$, $SnR_3$, NR—H, $NH_2$, MgCl, MgBr, MgI, $SiR_2F$, $SiRF_2$, ZnCl, ZnBr, ZnI or H if it is bound directly to a vinylic or acetylenic bond of M;
Ar is identical or different on each occurrence and is in each case a divalent aromatic or heteroaromatic ring system which has from 5 to 60 aromatic ring atoms and may also be substituted by one or more radicals F, Cl, Br, I, R or OR;
M is identical or different on each occurrence and is in each case a group Ar or an organic group having from 1 to 60 carbon atoms, preferably a group Ar, which is substituted by one or more, preferably two or more, vinyl or acetylene groups;
R is identical or different on each occurrence and is in each case H, a linear alkyl chain having from 1 to 40 carbon atoms or a branched or cyclic alkyl chain having from 3 to 40 carbon atoms, in which one or more nonadjacent carbon atoms may also be replaced by N—$R^1$, —O—, —S—, —O—CO—O—, —CO—O—, —$CR^1$=$CR^1$—, —C≡C— and in which one or more H atoms may also be replaced by F, Cl, Br, I or CN, or an aromatic or heteroaromatic ring system which has from 5 to 60 aromatic ring atoms and which may also be substituted by one or more nonaromatic radicals R; with two or more of the radicals R together also being able to form a ring system;
$R^1$ is identical or different on each occurrence and is in each case H or an aliphatic or aromatic hydrocarbon radical having from 1 to 20 carbon atoms;
n is on each occurrence a number in the range from 10 to 10 000;
m is on each occurrence either 0 or 1;
with the broken-line bond indicating the linkage in the polymer chain.

It is likewise possible for the monomers to bear more than two reactive groups X and/or Y. Such monomers lead to branching of the polymer chain. Furthermore, it is possible to add compounds having only one reactive group X or Y. Such compounds are incorporated at the end of the polymer chain.

For the purposes of the present invention, an aromatic or heteroaromatic ring system is a system which does not necessarily contain only aromatic or heteroaromatic groups. Instead, a plurality of aromatic or heteroaromatic groups in it can also be interrupted by a short nonaromatic unit (≤10% of the atoms other than H, preferably ≤5% of the atoms other than H), for example $sp^3$-hybridized C, N, etc., or else C=O, etc. Thus, for example, systems such as 9,9'-spirobifluorene, 9,9-diarylfluorene, triarylamine, diaryl ether, etc. are also regarded as aromatic ring systems. Furthermore, the incorporation of keto, phosphine oxide, sulphoxide and sulphone groups between two or more aryl groups is also regarded as an aromatic ring system for the purposes of the present invention, as is the incorporation of metal complexes having aromatic ligands.

For the purposes of the present invention, a $C_1$-$C_{40}$-alkyl group, in which individual H atoms or $CH_2$ groups may also be replaced by the abovementioned groups, is particularly preferably one of the radicals methyl, ethyl, n-propyl, i-propyl, n-butyl, i-butyl, s-butyl, t-butyl, 2-methylbutyl, n-pentyl, s-pentyl, cyclopentyl, n-hexyl, cyclohexyl, n-heptyl, cycloheptyl, n-octyl, cyclooctyl, 2-ethylhexyl, trifluoromethyl, pentafluoroethyl, 2,2,2-trifluoroethyl, ethenyl, propenyl, butenyl, pentenyl, cyclopentenyl, hexenyl, cyclohexenyl, heptenyl, cycloheptenyl, octenyl, cyclooctenyl, ethynyl, propynyl, butynyl, pentynyl, hexynyl and octynyl. A $C_1$-$C_{40}$-alkoxy group is particularly preferably methoxy, ethoxy, n-propoxy, i-propoxy, n-butoxy, i-butoxy, s-butoxy, t-butoxy or 2-methylbutoxy. An aromatic or heteroaromatic system which has 1-30 carbon atoms and may be substituted by the abovementioned radicals $R^1$ and can be linked via any positions on the aromatic or heteroaromatic is, in particular, a group derived from benzene, naphthalene, anthracene, phenanthrene, pyrene, chrysene, perylene, fluoranthene, tetracene, pentacene, benzopyrene, biphenyl, biphenylene, terphenyl, terphenylene, fluorene, spirobifuorene, dihydrophenanthrene, dihydropyrene, tetrahydropyrene, cis- or trans-indenofluorene, furan, benzofuran, isobenzofuran, dibenzofuran, thiophene, benzothiophene, isobenzothiophene, dibenzothiophene, pyrrole, indole, isoindole, carbazole, pyridine, quinoline, isoquinoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenanthrimidazole, pyrimidazole, pyrazinimidazole, quinoxalineimidazole, oxazole, benzoxazole, naphthoxazole, anthroxazole, phenanthroxazole, isoxazole, 1,2-thiazole, 1,3-thiazole, benzothiazole, pyridazine, benzopyridazine, pyrimidine, benzopyrimidine, quinoxaline, pyrazine, phenazine, naphthyridine, azacarbazole, benzocarboline, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole, 1,2,4,5-tetrazine, 1,2,3,4-tetrazine, 1,2,3,5-tetrazine, purine, pteridine, indolizine and benzothiadiazole.

In a preferred embodiment of the invention, all groups X are identical and all groups Y are identical in a reaction.

X is preferably Br or 1, particularly preferably nr.

Y is preferably X or $B(OR)_2$, $BR_2$, $SnR_3$, $SiR_2F$ or $SiRF_2$, where R is an aliphatic group, or NR—H, where R is an aromatic or aliphatic group, or $B(OH)_2$, MgCl, MgBr, MgI, ZnCl, ZnBr, ZnI or H if this is bound directly to a vinylic or acetylenic bond of M.

The coupling reaction catalysed by transition metals is preferably selected from the group consisting of Suzuki couplings, Yamamoto couplings, Hartwig-Buchwald couplings, Stille couplings, Heck couplings, Sonogashira couplings, Negishi couplings, Hiyama couplings and Grignard cross-couplings (Kumada couplings). A general overview of these coupling reactions and the reaction conditions usually employed for them may be found in *Cross Coupling Reactions* (*Topics in Current Chemistry*, Ed. N. Miyaura, 219, Springer-Verlag 2002) and in *Metal-catalysed Cross-coupling Reactions* (Ed. F. Diederich, P. J. Stang, Wiley-VCH, 1998).

Catalysts which can be used in the process of the invention are all homogeneous and heterogeneous catalysts which are suitable for coupling reactions of organic compounds and are known to those skilled in the art or mixtures of at least two of these catalysts. These are, as mentioned above, in particular catalysts based on palladium compounds or metallic palladium or on nickel compounds or metallic nickel. Catalysts which are suitable for the purposes of the invention also include catalysts formed in situ, i.e. catalysts which are formed immediately before or during the coupling reaction, for example from a metal-containing precursor of the catalyst or a metal salt, if appropriate with addition of one or more suitable ligands.

In a preferred embodiment of the present invention, at least one compound containing palladium in the oxidation state 0, if appropriate in the presence of at least one ligand, is used as catalyst or catalyst precursor. Preference is here given to using tetrakis(triarylphosphine)palladium(0), in particular tetrakis(triphenylphosphine)palladium(0) and tetrakis(tri-o-tolylphosphine)palladium(0), and also tris(dibenzylideneacetone)dipalladium(0) ($Pd_2dba_3$) or bis(tri-tert-butylphosphine)palladium(0).

Preference is likewise given to using at least one compound containing palladium in the oxidation state +II, if appropriate in the presence of at least one ligand, as catalyst or catalyst precursor in the process of the invention. Preference is given to palladium(II) halides, in particular palladium(II) chloride, palladium(II) carboxylates, in particular palladium(II) acetate, dichlorobis(triphenylphosphine)palladium(II), palladium(II) β-ketoketonates, in particular palladium(II) acetylacetonate, nitrilepalladium(II) halides, in particular dichlorobis(benzonitrile)palladium(II), allylpalladium halides, olefinpalladium halides, in particular dichloro(1,5-cyclooctadiene)palladium(II), or a mixture of at least two of these compounds. It is also possible for palladium(II) to be reduced to palladium(0) during the reaction.

Ligands are preferably added to the palladium(II) compounds. These are, in particular, phosphine ligands from the group consisting of triarylphosphines, triheteroarylphosphines, diarylalkylphosphines, diheteroarylalkylphosphines, aryldialkylphosphines, heteroaryldialkylphosphines or trialkylphosphines, with the substituents on the phosphorus being able to be identical or different, chiral or achiral and one or more of the substituents being able to link the phosphorus groups of a plurality of phosphines and these linkages also being able to be via one or more metal atoms. Furthermore, it is possible to use halophosphines, dihalophosphines, alkoxyphosphines, aryloxyphosphines, heteroaryloxyphosphines, dialkoxyphosphines, diaryloxyphosphines or diheteroaryloxyphosphines. Particularly preferred phosphine ligands are tris(o- or m- or p-tolyl)phosphine, tris(o- or m- or p-anisyl) phosphine, tris(o- or m- or p-fluorophenyl)phosphine, tris(o- or m- or p-chlorophenyl)phosphine, tris(2,6-dimethylphenyl) phosphine, tris(2,6-dimethoxy-phenyl)phosphine, tris(mesityl)phosphine, tris(2,4,6-trimethoxyphenyl)phosphine, tris(pentafluorophenyl)phosphine, tert-butyidi-o-tolylphosphine, di-tert-butyl-o-tolylphosphine, dicyclohexyl-2-biphenylphosphine, di-tert-butyl-2-biphenylphosphine, triethylphosphine, triisopropylphosphine, tricyclohexylphosphine, tri-tert-butylphosphine, tri-tert-pentylphosphine, bis(di-tert-butylphosphino)methane and 1,1'-bis(di-tert-butylphosphino)ferrocene.

Furthermore, discrete compounds of palladium(0) or palladium(II) with the above-described additional ligands are generally also possible.

The use of sulphonated ligands (e.g. EP 0694530) is also possible for forming water-soluble palladium complexes. This can offer advantages in the work-up, since the water-soluble catalyst can be separated off in a simple fashion by phase separation and no complicated extraction processes are necessary.

The use of heterogeneous or immobilized palladium catalysts (e.g. WO 04/016348) is likewise possible. While heterogeneous catalysts generally have the disadvantage that the smaller surface area compared to a homogeneously catalysed reaction results in lower conversions and especially lower selectivities being achieved in a reaction according to the prior art, a heterogeneously catalysed reaction is more easily possible in the continuous tube reactor, since here the ratio of surface area to volume is significantly greater than in a standard reactor or flask. The heterogeneous or immobilized palladium catalysts can be colloidal, disperse, unsupported or bound to various support materials, preferably to kieselguhr, silica, aluminium oxide, carbon or particularly preferably to the reactor wall.

Nickel and nickel compounds, in particular nickel(0) compounds, can also be used. Here, suitable catalysts are, for example, elemental nickel or disperse or colloidal metallic nickel, supported or unsupported, e.g. nickel sponge, nickel on kieselguhr, nickel on aluminium oxide, nickel on silica, nickel on carbon, nickel bound to the microreactor wall, nickel(II) carboxylates, in particular nickel(II) acetate, nickel(II) formate and nickel(II) oxalate, nickel(II) ketoketonates, in particular nickel(II) acetylacetonate, nickel(II) halides, in particular nickel(II) chloride, bromide and iodide, nickel(II) carbonate, nickel(II) nitrate, nickel(II) sulphate or complexes derived therefrom such as olefinnickel(II) halides, allylnickel(II) halides, addition compounds of the type $NiL_2(Hal)_2$, where Hal is chlorine, bromine, iodine and L is an uncharged ligand such as ammonia, acetonitrile, propionitrile or benzonitrile, bis(cyclooctadiene)nickel(0), tetrakis(triphenylphosphine)nickel(0) or further nickel(0) compounds.

For some of the abovementioned coupling reactions it is helpful or necessary to use a base in addition to the monomers and the catalyst. The choice of base depends on the coupling reaction and the precise way in which the reaction is carried out. All bases known to those skilled in the art which are suitable for coupling reactions of organic compounds can be used as base. Preferred bases are organic hydroxides, alkali metal and alkaline earth metal hydroxides, oxides, carboxylates, carbonates, hydrogencarbonates, phosphates, hydrogenphosphates and fluorides, in particular sodium and potassium hydroxide, acetate, carbonate, hydrogencarbonate, phosphate and fluoride, or metal alkoxides; preference is given to phosphates or carbonates but also organic hydroxides, for example tetraalkylammonium hydroxide. For water-free reactions, preference is given to using a heavy alkali metal, particularly preferably caesium, as counterion because of the better solubility of the corresponding salts in organic solvents. Further bases which can be used are organic amines, preferably triethylamine, diethylamine or tri-n-butylamine, or nitrogen-containing, aromatic or nonaromatic heterocycles, preferably pyridine or N-methylpyrrolidone. It is also possible to use mixtures of the bases.

In the process of the invention, it is important that the monomers used and if appropriate also the catalyst if no heterogeneous catalyst has been used are present in dissolved or if appropriate finely suspended form, preferably in dissolved form. In particular, a suitable solvent has to be used, also to dissolve the polymer formed as reaction product. The solvents are preferably selected from the group consisting of aromatic solvents, in particular toluene, anisole, chlorobenzene, xylenes, mesitylene or phenyl ethers, straight-chain, branched or cyclic ethers, in particular diethyl ether, methyl tert-butyl ether, tetrahydrofuran, dioxane or polyethylene glycol ethers, N-containing heterocyclic solvents, in particular pyridine, alcohols, in particular methanol, ethanol, propanol, isopropanol, tert-butanol or ethylene glycol, dipolar aprotic solvents, in particular DMF, dimethylacetamide, NMP (N-methylpyrrolidone) or DMSO, organic esters, nitriles, in particular benzonitrile or acetonitrile, sulphoxides, organic amides and organic carbonates, halogenated solvents, in particular dichloromethane, chloroform, 1,2-dichloroethane or 1,1,2,2-tetrachloro-ethane, or straight-chain, branched or cyclic hydrocarbons or a mixture of at least two of the abovementioned solvents. Preference is given to aromatic solvents or solvent mixtures containing at least one aromatic solvent.

The addition of water can also be found to be useful, for example to dissolve a base or an inorganic salt. It can be appropriate to carry out the reaction in a single phase or as a two-phase reaction. In the case of a two-phase reaction, it can be helpful to make additional use of a phase transfer catalyst. Furthermore, the addition of at least one solvent which is miscible with water and with the organic phase can be useful in order to increase the contact between the compounds dissolved in the different phases.

Preferred embodiments of the individual types of coupling reactions will be described below.

The Suzuki coupling is, for the purposes of the present invention, the coupling of an aromatic, heteroaromatic or vinylic boron derivative with an aromatic or heteroaromatic halide or sulphonate in the presence of a base and a transition metal catalyst. Here, the boron derivative is preferably selected from the group consisting of boronic acids, borinic acids, boronic anhydrides or open-chain or cyclic boronic esters, in particular glycol or pinacol esters. Palladium compounds are preferably selected as catalysts. The ligands on the palladium for multiphase reactions are preferably triarylphosphines, in particular triphenylphosphine and tri-o-tolylphosphine. As solvents, preference is given to using aromatic solvents or ethers. Alkali metal carbonates and phosphates have been found to be particularly useful as bases. For the water-free Suzuki coupling, preference is given to using trialkyl-phosphine ligands, in particular tri-tert-butylphosphine and tricyclohexylphosphine, in combination with CsF, KF or $Cs_2CO_3$ as base.

The Yamamoto coupling is, for the purposes of the present invention, the coupling of two aromatic or heteroaromatic halides and/or sulphonates in the presence of a transition metal catalyst and, if appropriate, a reducing agent for the catalytic reaction. In the Yamamoto coupling, all reactive groups are halides, in particular bromides or iodides, or sulphonates. Catalysts which can be used are, in particular, nickel compounds, and for the catalytic reaction it is necessary to add a reducing agent which can reduce the nickel(II) formed during the reaction back to nickel(0). Suitable reducing agents are, in particular, base metals, for example zinc or manganese, or inorganic reducing agents such as hydrazine. The addition of a base is not necessary.

The Hartwig-Buchwald coupling is, for the purposes of the present invention, the coupling of a primary or secondary amine with an aromatic or heteroaromatic halide or sulphonate in the presence of a base and a transition metal catalyst. Catalysts selected here are once again predominantly palladium compounds as have been described above. Whether the reaction proceeds to form the secondary or tertiary amine can be controlled by choice of the ligands. For the formation of secondary amines, preference is given to using bidentate arylphosphines, in particular 1,2-bis(diphenylphosphino)ethane (dppe), 1,3-bis(diphenylphosphino)propane (dppp), 1,1'-bis(diphenylphosphino)ferrocene (dppf) or 2,2'-bis(diphenylphosphino)-1,1'-binaphthyl (BINAP), as ligands. For the formation of tertiary amines, preference is given to using electron-rich, bulky phosphines or halophosphines, for example trialkylphosphines, in particular tri-tert-butylphosphine, dialkylhalophosphines, in particular di-tert-butylchlorophosphine, dialkoxyhalophosphines, alkyldihalophosphines, in particular tert-butyldichlorophosphine, and alkoxydihalophosphines. The reaction is generally carried out in the absence of water in aromatic hydrocarbons, in particular toluene or xylene, with addition of a strong base, preferably an alkali metal alkoxide, in particular NaOtBu.

The Stille coupling is, for the purposes of the present invention, the coupling of an aromatic or heteroaromatic tin derivative with an aromatic or heteroaromatic halide or sulphonate in the presence of a transition metal catalyst. The tin derivative is preferably a trialkyltin group, in particular a tributyltin group or a trimethyltin group. Catalysts used are, in particular, the palladium compounds and ligands mentioned above for the Suzuki coupling. Here, triarylarsines and trifurylphosphines are also particularly useful as ligands. The addition of a base is not necessary for the Stille coupling. The reaction is preferably carried out in an aromatic hydrocarbon, in particular toluene or xylene, or in a dipolar aprotic solvent, in particular DMF.

The Heck coupling is, for the purposes of the present invention, the coupling of a compound having a vinylic hydrogen with an aromatic or heteroaromatic halide or sulphonate in the presence of a base and a transition metal catalyst. Suitable catalysts here are the palladium precursors and ligands which have been mentioned above for the Suzuki coupling. Palladium nanoparticles coated with aminocarboxylic acids, as described, for example, in WO 98/42644, have also been found to be useful as catalyst. Carbene complexes, too, have been used successfully as catalysts for the Heck coupling. The addition of nitrogen-containing additives, in particular aminocarboxylic acids, and metal-containing additives, in particular iron or iron compounds, can also have a very positive effect on the yield, as described, for example, in WO 02/10093. Suitable bases are, in particular, amines and alkali metal carbonates and hydrogencarbonates. As solvents, preference is given to using dipolar aprotic solvents and alcohols.

The Sonogashira coupling is, for the purposes of the present invention, the coupling of a compound having an acetylenic hydrogen with an aromatic or heteroaromatic halide or sulphonate in the presence of a transition metal catalyst and, if appropriate, with addition of a further metal compound, in particular a copper(I) compound, in the presence of a base. Catalysts used are, in particular, the palladium compounds mentioned above for the Suzuki coupling, with the addition of a copper salt, in particular a copper(I) salt, preferably copper(I) iodide, being necessary here. Bases used are, in particular, aliphatic or aromatic amines.

The Negishi coupling is, for the purposes of the present invention, the coupling of an aromatic or vinylic zinc compound with an aromatic or heteroaromatic halide or sulphonate in the presence of a transition metal catalyst, preferably a palladium catalyst, and a base.

The Hiyama coupling is, for the purposes of the present invention, the coupling of an aromatic or heteroaromatic silyl compound which bears at least one fluorine atom on the silicon with an aromatic or heteroaromatic halide or sulphonate in the presence of a transition metal catalyst, preferably a palladium catalyst, and a base.

The Grignard cross-coupling (Kumada coupling) is, for the purposes of the present invention, the coupling of an aromatic, heteroaromatic or vinylic Grignard compound with an aromatic or heteroaromatic halide or sulphonate in the presence of a palladium catalyst and a base.

The chosen concentration of the reaction components depends greatly on the respective reaction, on the structure of the polymer produced in the particular case and on the desired molecular weight of the polymer. Owing to the viscosity increase which occurs, the reaction is generally carried out at concentrations of less than 1 mol/l (based on the C—C or C—N bonds to be formed), preferably at concentrations of less than 0.2 mol/l.

In a further embodiment of the process of the invention, the catalyst is used in an amount of from 0.00001 to 50 mol %, preferably from 0.0001 to 10 mol %, particularly preferably from 0.001 to 1 mol %, based on the number of C—C or C—N bonds to be formed.

In the case of reactions according to Scheme 1, the ratio of the monomers is preferably selected so that the leaving groups X and Y are present in an equimolar ratio. The highest molecular weights can be achieved in this way. However, one of the two types of monomer can also be used in a slight excess. This can be useful, for example, for setting the molecular weight of the polymer in the desired range.

The selectivity of the reaction depends on the concentration of the reagents used and also on a series of further parameters such as the temperature, the type of leaving group, the type of catalyst and the residence time. A person skilled in the art will be able to match the various parameters to the respective reaction and the monomers used in the particular case so that the polymer is obtained in the desired molecular weight range.

A further possible way of carrying out reactions according to Scheme 1 in which the groups X and Y are different (i.e. all of the reactions mentioned apart from the Yamamoto coupling) is to carry them out in at least two stages, with an excess of one of the monomers being used in the first stage so as to form an oligomer having a first composition which has a small number (generally from 3 to 20) of repeating units. The remaining monomers are subsequently added in one or more further stage(s) so that the ratio of the two different reactive groups X and Y is finally 1:1. The monomer composition in the second or further stages is preferably different from that in the first stage, so that polymers having a block structure are formed. The precise way in which this can be carried out and appropriate structures are described, for example, in WO 05/014688. All successive reaction steps are preferably carried out in the continuous tube reactor or in tube reactors connected in series.

In one embodiment of the invention, further monofunctional compounds which represent a chain end in the polycondensation are added in addition to the abovementioned monomers to the reaction mixture right at the beginning of the reaction. This can be useful for setting and limiting the molecular weight of the polymer.

In a further embodiment of the invention, the reaction mixture contains at least one monomer which bears at least three reactive groups X and/or Y and thus leads to branches in the polymer chain. The appropriate use of such monomers is described, for example, in DE 102004032527.8.

It has been found to be preferable to carry out end capping, i.e. to add monofunctional compounds which react with any reactive end groups of the polymers, at the end of the reaction in the same reaction step or in a separate reaction step after isolation of the polymer. It has likewise been found to be useful to carry out, if appropriate, other after-treatments in order to reduce the content of particular impurities, as described, for example, in EP 04023475.9. The end capping or the after-treatment is preferably likewise carried out in the continuous tube reactor.

At the end of the reaction, the polymer can be purified further by means of customary purification methods. For use in demanding applications (e.g. polymeric light-emitting diodes), contamination with organic substances (e.g. oligomers) and inorganic substances (e.g. catalyst residues, residues of base) should generally be brought down to a very low level. In the case of a homogeneous catalyst, this is preferably achieved by extraction, if appropriate using complexing agents, preferably cyanide or thiocarbamate, by means of ion exchangers or other processes and can also, if appropriate, be carried out at elevated temperature. Another suitable method of removing further inorganic impurities is, for example, extraction with inorganic mineral acids. The extraction steps are particularly preferably likewise carried out in the continuous tube reactor. The phase separation can then be carried out, for example, in a demixing element. A possible structure of such a demixing element is a channel having a hydrophilic wall, for example glass, and a hydrophobic wall, for example Teflon. It can also be appropriate to carry out a plurality of such extraction steps in succession by means of mixing and demixing elements connected in series in one or more tube reactor systems.

A further possible purification method is the use of an ion exchange material supported on the tube reactor wall, if appropriate in combination with a turbulence-producing element to achieve better contact with the wall. This can be implemented significantly more efficiently in the continuous tube reactor than in processes according to the prior art, since the larger ratio of surface area to volume ensures significantly better contact with the reactor wall.

The isolation and the precipitation or reprecipitation of the polymers is preferably carried out batchwise outside the tube reactor.

The process of the invention offers the following advantages over processes according to the prior art:
1. In the process of the invention, the danger to human beings and the environment posed by escaping chemicals is considerably reduced and the process thus leads to increased safety when handling dangerous substances and solvents.
2. Coupling of organic compounds by the process of the invention allows better control of the reaction conditions, e.g. reaction time and reaction temperature, than is possible in conventional processes. As a result, the coupling reaction in the process of the invention is very rapid and can be regulated precisely. The polymers can thus be obtained in the desired molecular weight range, with the reproducibility being significantly improved compared to the prior art.
3. It is also particularly advantageous that the process of the invention can be carried out continuously. As a result, any desired amounts of the desired polymers can be prepared in the desired molecular weight range more quickly and cheaply than in conventional processes.
4. The purification of the polymers is significantly more efficient than in processes according to the prior art. Since the purity of the polymers plays a very critical role in use of the polymers in organic electronic devices, this is a considerable advantage over processes according to the prior art.

However, it is particularly surprising and unexpected that these polycondensation reactions can be carried out in the continuous tube reactor, in particular for, inter alia, the synthesis of fully conjugated polyarylenes whose stiff structure and high solution viscosity would have led one to expect problems in solution transport in the narrow channels of the tube reactor. The prior art would also have led a person skilled in the art to this expectation, since coupling reactions catalysed by transition metals in a microreactor have been described in the prior art, but not their application to polycondensations of the type in question, so that a person skilled in the art will have been led to the presumption that such polycondensations could not be realized industrially.

The invention further provides polymers obtained by the process of the invention.

In addition, the present invention also provides for the use of these polymers in organic electronic devices.

The invention additionally provides organic electronic devices comprising one or more of these polymers. The organic electronic devices are preferably selected from the group consisting of polymeric organic light-emitting diodes (PLEDs), organic integrated circuits (O-ICs), organic field effect transistors (O-FETs), organid thin film transistors (O-TFTs), organic solar cells (O-SCs), organic field quench devices (O-FQDs), organic light-emitting transistors (O-LETs) and organic laser diodes (O-lasers), particularly preferably polymeric organic light-emitting diodes.

EXAMPLES

Polymers were synthesized from the monomers M1, M2 and M3 shown below by the Suzuki method. This was carried out using either a tube reactor having a diameter of 1 mm and a length of 500 mm (Examples 1 and 2) or a batch reactor (glass flask, Examples 3 and 4, reference according to the prior art). A mixture of toluene, dioxane and water (2:2:1) was used as solvent, potassium phosphate hydrate was used as base and Pd(OAc)$_2$ and P(o-tolyl)$_3$ were used as catalyst. The precise composition of the polymers and the reaction results are summarized in Table 1. As can be seen from the results, the polydispersity (PD) of the polymers according to the invention synthesized in the continuous tube reactor is lower than that of the reference polymers according to the prior art. Furthermore, the polymers according to the invention display better properties in electroluminescence (higher efficiency, lower voltage, longer life) than the polymers according to the prior art. The polymers synthesized by the process of the invention are therefore better suited for use in organic light-emitting diodes than polymers which have been synthesized by batch processes according to the prior art.

TABLE 1

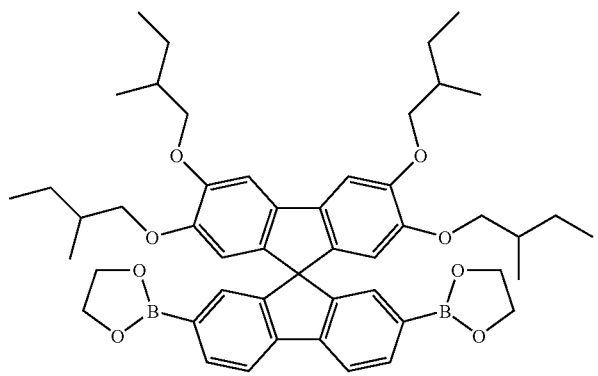 [SMILES: CCC(C)COc1cc2c(cc1OCC(C)CC)C1(c3cc(B4OCCO4)ccc3-c3ccc(B4OCCO4)cc31)c1cc(OCC(C)CC)c(OCC(C)CC)cc1-2]

TABLE 1-continued

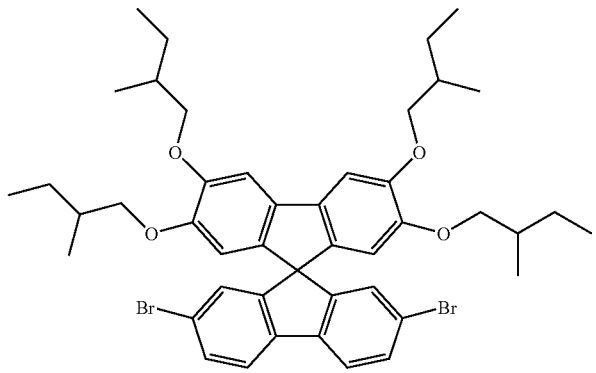 [SMILES: CCC(C)COc1cc2c(cc1OCC(C)CC)C1(c3cc(Br)ccc3-c3ccc(Br)cc31)c1cc(OCC(C)CC)c(OCC(C)CC)cc1-2]

M2

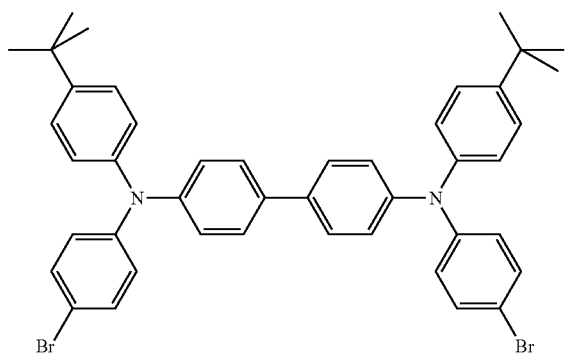 [SMILES: CC(C)(C)c1ccc(N(c2ccc(Br)cc2)c2ccc(-c3ccc(N(c4ccc(Br)cc4)c4ccc(C(C)(C)C)cc4)cc3)cc2)cc1]

M3

| | | Reactor | | | Residence time [min] | Proportion of the monomers in the polymerization [mol %] | | | GPC[a] | | | Electroluminescence | | |
|---|---|---|---|---|---|---|---|---|---|---|---|---|---|---|
| | | | | | | | | | | | | Max. Eff[b] | | |
| Ex. | Polymer | Diameter | Length | Flow rate | | M1 | M2 | M3 | Mw | Mn | PD | [cd/A] | U[c] | Life[d] |
| 1 | P1 | 1 mm | 500 mm | 200 µL/min | 8 | 50 | 50 | | 280 | 120 | 2.33 | 2.8 | 4.1 | 400 |
| 2 | P2 | 1 mm | 500 mm | 180 µL/min | 9 | 50 | 40 | 10 | 240 | 110 | 2.18 | 4.8 | 3.9 | 2000 |
| 3 | Ref. | | Batch reactor | | 38 | 50 | 50 | | 355 | 130 | 2.73 | 2.0 | 4.5 | n.d. |
| 4 | Ref. | | Batch reactor | | 42 | 50 | 40 | 10 | 460 | 150 | 3.07 | 3.6 | 4.2 | 900 |

[a]GPC measurements: THF; 1 ml/min, PlgeI 10 µm Mixed-B 2 × 300 × 7.5 mm², 35° C., RI detection was calibrated against polystyrene; reported in kDa.
[b]Max. Eff.: Maximum efficiency, measured in cd/A.
[c]Voltage at a brightness of 100 cd/m².
[d]Life: Time for the brightness to drop to 50% of the initial brightness (extrapolated to an initial brightness of 100 cd/m²).

The invention claimed is:

1. A process for preparing polymers comprising the step of polycondensing monomers by means of C—C or C—N coupling reactions in the presence of a solvent or solvent mixture and at least one transition metal catalyst, and optionally in the presence of at least one base and/or at least one additive, wherein said polycondensation step is carried out in a continuous tube reactor and
    said continuous tube reactor has a volume of less than or equal to 20 ml,
    said continuous tube reactor comprises channels having a diameter of from 10 µm to 20 mm and said step comprises pumping reaction solution into said continuous tube reactor so that said reaction solution flows through said continuous tube reactor at a flow rate of from 0.01 µL/min to 100 mL/min.

2. The process according to claim 1, wherein said step comprises conveying reaction solution through two or more continuous tube reactors connected in series.

3. The process according to claim 1, wherein said step comprises conveying reaction solution through two or more continuous tube reactors connected in parallel.

4. The process according to claim 1, wherein the residence time of reaction solution in said continuous tube reactor is less than or equal to 2 hours.

5. The process according to claim 1, wherein said step is carried out at a temperature of from −80° C. to 250° C.

6. The process according to claim 1, wherein polycondensation progress is monitored and controlled by means of viscometry.

7. The process according to claim 1, wherein said transition metal catalyst comprises a transition metal or a transition metal compound selected from the group consisting of palladium, palladium compounds, nickel, nickel compounds, cobalt, cobalt compounds, iron, and iron compounds.

8. The process according to claim 1, wherein said C—C or C—N coupling reaction is selected from the group consisting of Suzuki couplings, Yamamoto couplings, Hartwig-Buchwald couplings, Stille couplings, Heck couplings, Sonogashira couplings, Negishi couplings, Hiyama couplings, and Grignard cross-couplings.

9. The process according to claim 1, wherein the polycondensation proceeds according to the reaction shown in Scheme 1 or to the reaction shown in Scheme 2:

(Scheme 1)

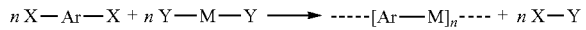

(Scheme 2)

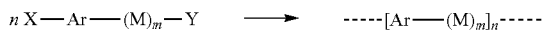

wherein

X identically or differently on each occurrence is chlorine, bromine, iodine, fluoroalkylsulphonate, or perfluoroalkylsulphonate;

Y identically or differently on each occurrence is X, B(OH)$_2$, B(OR)$_2$, BR$_2$, SnR$_3$, NR—H, NH$_2$, MgCl, MgBr, MgI, SiR$_2$F, SiRF$_2$, ZnCl, ZnBr, or ZnI; or H if Y is bound directly to a vinylic or acetylenic bond of M;

Ar identically or differently on each occurrence is a divalent aromatic or heteroaromatic ring system having from 5 to 60 aromatic ring atoms, optionally substituted by one or more radicals R or OR;

M identically or differently on each occurrence is Ar or an organic group having from up to 60 carbon atoms, substituted by one or more vinyl or acetylene groups;

R identically or differently on each occurrence is H, a linear alkyl chain having up to 40 carbon atoms, or a branched or cyclic alkyl chain having from 3 to 40 carbon atoms, wherein one or more nonadjacent carbon atoms of said linear, branched, and cyclic alkyl chains is optionally replaced by N—R$^1$, O, S, O—CO—O, CO—O, —CR$^1$=CR$^1$—, or —C≡C—, and wherein one or more H atoms is optionally replaced by F, Cl, Br, I, CN, or an aromatic or heteroaromatic ring system having from 5 to 60 aromatic ring atoms, wherein said aromatic or heteroaromatic ring system is optionally substituted by one or more nonaromatic radicals R; and wherein two or more radicals R optionally define a ring system;

R$^1$ identically or differently on each occurrence is H or an aliphatic or aromatic hydrocarbon radical having from up to 20 carbon atoms;

n is on each occurrence a number in the range of from 10 to 10 000;

is on each occurrence either 0 or 1; and wherein the broken lines indicate the linkage in the polymer chain.

10. The process according to claim 9, wherein each X is identical and each Y is identical.

11. The process according to claim 1, wherein said at least one transition metal catalyst comprises or is prepared from at least one compound containing palladium having an oxidation state of 0.

12. The process according to claim 1, wherein said at least one transition metal catalyst comprises or is prepared from at least one compound containing palladium having an oxidation state of +II.

13. The process according to claim 12, wherein said at least one transition metal catalyst comprises at least one ligand selected from the group consisting of triarylphosphines; triheteroarylphosphines; diarylalkylphosphines; diheteroarylalkylphosphines; aryldialkylphosphines; heteroaryldialkylphosphines; trialkylphosphines; halophosphines; dihalophosphines; alkoxyphosphines; aryloxyphosphines; heteroaryloxyphosphines; dialkoxyphosphines; diaryloxyphospines; and diheteroaryloxyphosphines; wherein the phosphorus substituents of said triarylphosphines, triheteroarylphosphines, diarylalkylphosphines, diheteroarylalkylphosphines, aryldialkylphosphines, heteroaryldialkylphosphines, and trialkylphosphines are optionally identical, different, chiral, or achiral, and wherein one or more of said phosphorus substituents optionally link the phosphorus substituents of a plurality of phosphines and these linkages can also occur via one or more metal atoms.

14. The process according to claim 1, wherein said at least one transition metal catalyst is a heterogeneous or immobilized palladium catalysts.

15. The process according to claim 1, wherein said at least one transition metal catalyst is nickel or a nickel compound.

16. The process according to claim 15, wherein said nickel or nickel compound is selected from the group consisting of elemental nickel; disperse metallic nickel; colloidal metallic nickel; supported nickel; unsupported nickel; nickel sponge; nickel on kieselguhr; nickel on aluminium oxide; nickel on silica; nickel on carbon; nickel(II) carboxylates; nickel(II) ketoketonates; nickel(II) halides; nickel(II) carbonate; nickel (II) nitrate; nickel(II) sulphate; olefinnickel(II) halides; allylnickel(II) halides; addition compounds of the type NiL$_2$ (Hal)$_2$, wherein Hal is chlorine, bromine, iodine and L is an uncharged ligand; bis(cyclooctadiene)nickel(0); and tetrakis (triphenylphosphine)nickel(0).

17. The process according to claim 1, wherein said step is carried out in the presence of at least one base.

18. The process according to claim 17, wherein said at least one base is selected from the group consisting of alkali metal hydroxides; alkaline earth metal hydroxides; alkali metal oxides; alkaline earth metal oxides; alkali metal carboxylates; alkaline earth metal carboxylates; alkali metal carbonates; alkaline earth metal carbonates; alkali metal hydrogencarbonates; alkaline earth metal hydrogencarbonates; alkali metal phosphates; alkaline earth metal phosphates; alkali metal hydrogenphosphates; alkaline earth metal hydrogenphosphates; alkali metal fluorides; alkaline earth metal fluorides; metal alkoxides; organic hydroxides; organic amines; nitrogen-containing aromatic heterocycles; nitrogen-containing nonaromatic heterocycles; and mixtures thereof.

19. The process according to claim 1, wherein said solvent is selected from the group consisting of aromatic solvents, straight-chain ethers, branched ethers, cyclic ethers, N-containing heterocyclic solvents, alcohols, dipolar aprotic solvents, organic esters, nitriles, sulphoxides, organic amides, organic carbonates, halogenated solvents, straight-chain hydrocarbons, branched hydrocarbons, cyclic hydrocarbons, and mixtures thereof.

20. The process according to claim 1, wherein said step is carried out in the presence of water.

21. The process according to claim 1, wherein said at least one transition metal catalyst is present in an amount of from 0.00001 to 50 mol %, based on the number of C—C or C—N bonds to be formed.

22. The process according to claim 1, further comprising the step of purifying said polymers or oligomers; wherein said purification is carried out by means of extraction, optionally using complexing agents; or by means of ion exchangers, which are optionally bound to the wall of the continuous tube reactor.

23. The process according to claim 22, wherein said purification is carried out in one or more mixing and demixing steps in said continuous tube reactor.

24. The process according to claim 1, wherein said continuous tube reactor is a microreactor.

25. The process according to claim 22, wherein said at least one transition metal catalyst is a heterogeneous or immobilized palladium catalysts and is present in an amount of from 0.00001 to 50 mol %, based on the number of C—C or C—N bonds to be formed and polycondensation progress is monitored and controlled by means of viscometry.

26. A process for preparing polymers comprising the step of polycondensing monomers by means of C—C or C—N coupling reactions in the presence of a solvent or solvent mixture and at least one transition metal catalyst, and optionally in the presence of at least one base and/or at least one additive, wherein said polycondensation step is carried out in a continuous tube reactor and wherein said C—C or C—N coupling reaction is selected from the group consisting of Suzuki couplings, Yamamoto couplings, Hartwig-Buchwald couplings, Stille couplings, Heck couplings, Sonogashira couplings, Negishi couplings, Hiyama couplings, and Grignard cross-couplings and the polycondensation proceeds according to the reaction shown in Scheme 1 or to the reaction shown in Scheme 2:

(Scheme 1)

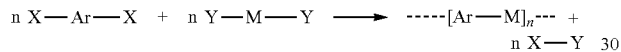

(Scheme 2)

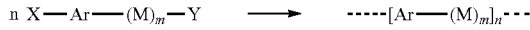

wherein

X identically or differently on each occurrence is chlorine, bromine, iodine, fluoroalkylsulphonate, or perfluoroalkylsulphonate;

Y identically or differently on each occurrence is X, $B(OH)_2$, $B(OR)_2$, $BR_2$, $SnR_3$, NR—H, $NH_2$, MgCl, MgBr, MgI, $SiR_2F$, $SiRF_2$, ZnCl, ZnBr, or ZnI; or H if Y is bound directly to a vinylic or acetylenic bond of M;

Ar identically or differently on each occurrence is a divalent aromatic or heteroaromatic ring system having from 5 to 60 aromatic ring atoms, optionally substituted by one or more radicals R or OR;

M identically or differently on each occurrence is Ar or an organic group having from up to 60 carbon atoms, substituted by one or more vinyl or acetylene groups;

R identically or differently on each occurrence is H, a linear alkyl chain having up to 40 carbon atoms, or a branched or cyclic alkyl chain having from 3 to 40 carbon atoms, wherein one or more nonadjacent carbon atoms of said linear, branched, and cyclic alkyl chains is optionally replaced by N—$R^1$, O, S, O—CO—O, CO—O, —$CR^1$=$CR^1$—, or —C≡C—, and wherein one or more H atoms is optionally replaced by F, Cl, Br, I, CN, or an aromatic or heteroaromatic ring system having from 5 to 60 aromatic ring atoms, wherein said aromatic or heteroaromatic ring system is optionally substituted by one or more nonaromatic radicals R; and wherein two or more radicals R optionally define a ring system;

$R^1$ identically or differently on each occurrence is H or an aliphatic or aromatic hydrocarbon radical having from up to 20 carbon atoms;

n is on each occurrence a number in the range of from 10 to 10 000;

m is on each occurrence either 0 or 1; wherein said polycondensation step is carried out in a continuous tube reactor and said continuous tube reactor has a volume of less than or equal to 20 ml, said continuous tube reactor comprises channels having a diameter of from 10 μm to 20 μm and said step comprises pumping reaction solution into said continuous tube reactor so that said reaction solution flows through said continuous tube reactor at a flow rate of from 0.01 μL/min to 100 mL/min; and wherein the broken lines indicate the linkage in the polymer chain.

* * * * *